(No Model.)  3 Sheets—Sheet 1.

J. N. BALL.
KITCHEN CABINET.

No. 413,842. Patented Oct. 29, 1889.

WITNESSES:
Donn Twitchell
C. Sedgwick

INVENTOR
J. N. Ball
BY
Munn & Co.
ATTORNEY (No Model.) 3 Sheets—Sheet 2.
J. N. BALL.
KITCHEN CABINET.
No. 413,842. Patented Oct. 29, 1889.
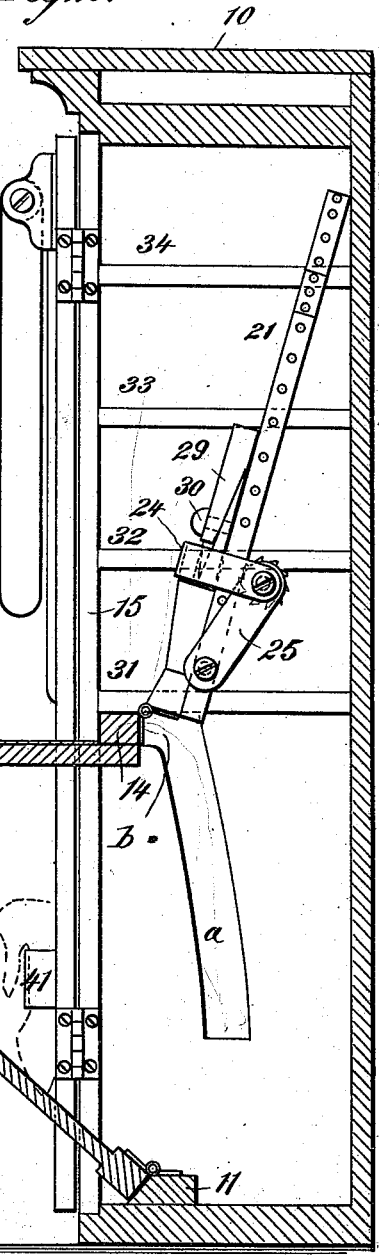
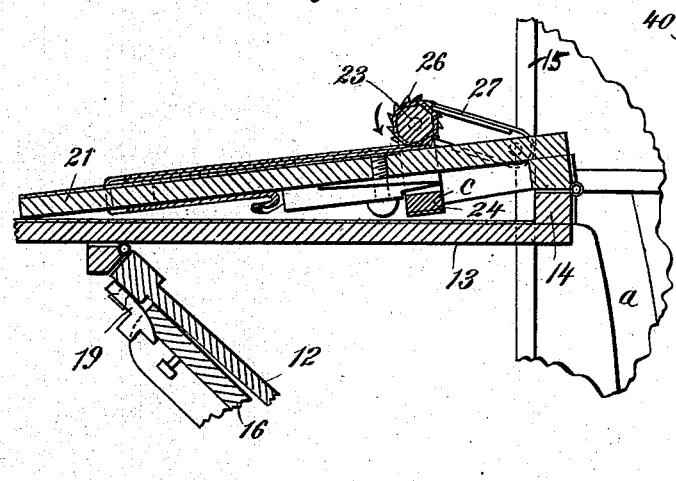
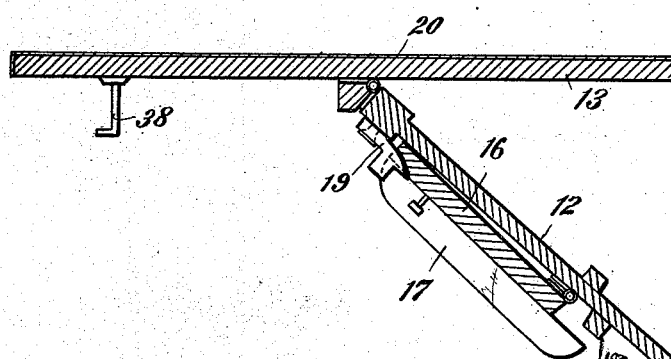
WITNESSES:
Donn Twitchell
C. Sedgwick
INVENTOR
J. N. Ball
BY
Munn & Co.
ATTORNEY (No Model.) 3 Sheets—Sheet 3.
J. N. BALL.
KITCHEN CABINET.

No. 413,842. Patented Oct. 29, 1889.

WITNESSES:
Donn Twitchell
C. Sedgwick

INVENTOR
J. N. Ball
BY Munn & Co.
ATTORNEY

UNITED STATES PATENT OFFICE.

JOHN NELSON BALL, OF KANSAS CITY, KANSAS.

KITCHEN-CABINET.

SPECIFICATION forming part of Letters Patent No. 413,842, dated October 29, 1889.

Application filed April 2, 1889. Serial No. 305,706. (No model.)

*To all whom it may concern:*

Be it known that I, JOHN NELSON BALL, of Kansas City, in the county of Wyandotte and State of Kansas, have invented a new and Improved Kitchen-Cabinet, of which the following is a full, clear, and exact description.

The object of my invention is to provide a cabinet in connection with which there is arranged an ironing-board and attachments in a manner such that when not in use the board and its attachments may be moved to a position out of the way, the space within the cabinet being available for the stowage of numerous articles, as will be hereinafter explained, and specifically pointed out in the claims.

Reference is to be had to the accompanying drawings, forming a part of this specification, in which similar figures and letters of reference indicate corresponding parts in all the views.

Figure 1:
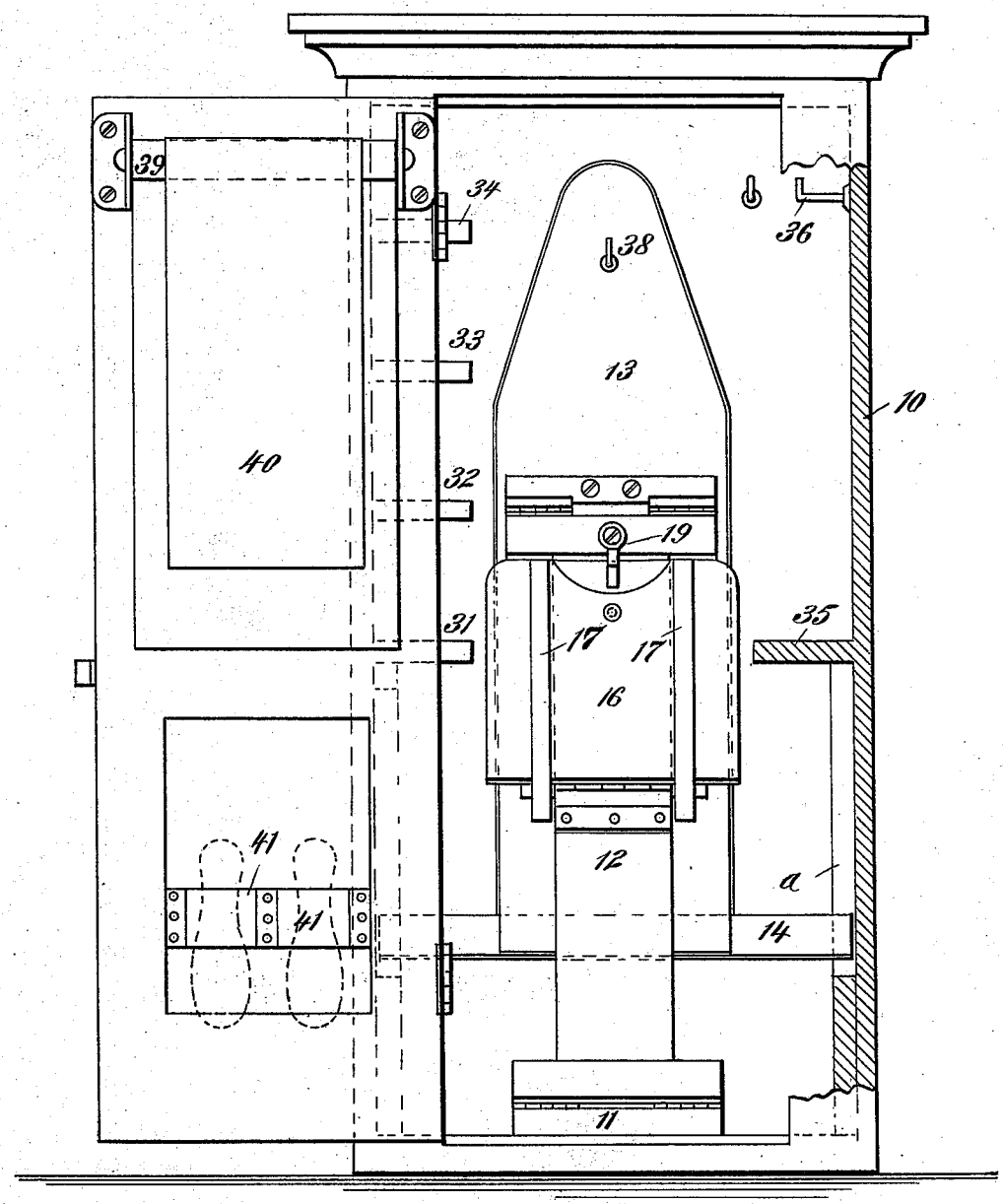
Figure 4:
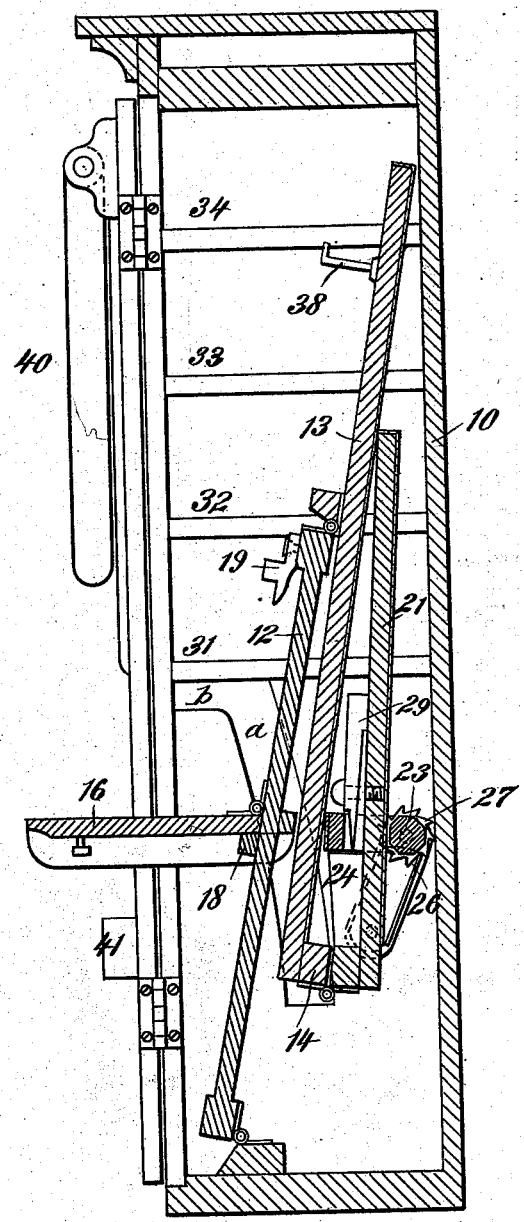
Figure 5:
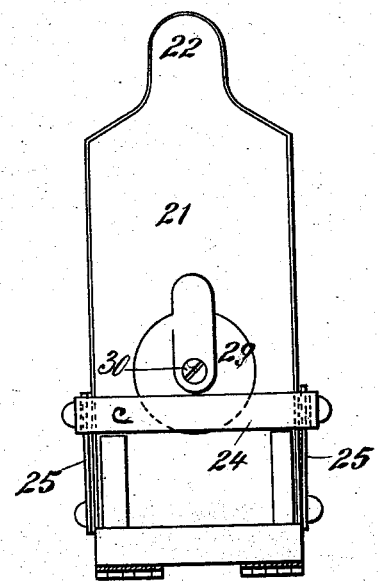
Figure 6:
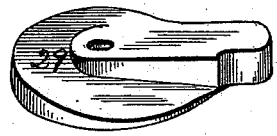

Figure 1 is a face view of my improved cabinet, parts being broken away and shown in section, and the door of the cabinet being represented as it appears when open. Fig. 2 is a central sectional elevation of the cabinet, the ironing-board being represented as it appears when adjusted to a horizontal position, the bosom-board being folded up within the cabinet. Fig. 3 is a sectional view of the ironing-board and the bosom-board, the bosom-board being represented as it appears when lowered for use. Fig. 4 is a central sectional elevation of the cabinet and the parts arranged therein, the ironing-board being folded to its position within the cabinet, and the wash-bench, which is connected to the ironing-board, being represented as it appears when lowered for use; and Fig. 5 is an inverted plan view of the bosom-board. Fig. 6 is a detail view of the cam 29.

In the drawings, 10 represents a cabinet, in the walls of which there are formed forwardly-inclined slots $a$, which lead to horizontal slots $b$. To the flooring of the cabinet 10 I secure a block 11, and to this block 11 I hinge a brace 12, which brace is in turn hinged to an ironing-board 13, which is provided with a transverse strip 14. The ends of the strip 14 enter the slots formed in the side walls of the cabinet, the arrangement being such that when the ironing-board is moved to the position in which it is shown in Figs. 2 and 3 the strip will bear against the inner faces of the door-jambs 15 and will hold the ironing-board in a horizontal position; but when the extending end of the ironing-board is moved upward the strip 14 will move downward within the slots $a$ to the position in which the parts are shown in Fig. 1.

To the under side of the brace 12 I hinge a leaf 16, such leaf being strengthened by ribs 17, which are so placed as to pass to the sides of the brace 12 when the leaf is moved to the position in which it is shown in Fig. 4; and in order that the hinges by which the leaf is connected to the brace may be somewhat relieved from the strain which would otherwise be imposed upon them I secure a cleat 18 to the brace in a position such that when the leaf 16 is folded down it will rest upon the cleat; and in order that the leaf when not in use may be held in the position in which it is shown in Figs. 1, 2, and 3 I secure a turn-button 19 to the brace in a position such that it may be turned down to engage the leaf. This leaf 16, when adjusted as represented in Fig. 4, serves as a wash-bench.

The ironing-board 13 is covered with the ordinary ironing blanket and sheet, as indicated at 20, and upon this board an ordinary ironing would be done; but in order that shirts may be properly ironed and held to the required position while being ironed I provide a bosom-board 21, which board is hinged to the strip 14. The bosom-board 21 has a projection 22, about which the neck of the shirt is adjusted; and in order that the shirt may be smoothly held upon the board while being ironed I provide a roller 23, which is mounted in a movable frame 24, which said frame is held from longitudinal displacement by links 25, that are pivotally connected to the side edges of the bosom-board at a point near the inner end of the said board. The roller 23 carries a ratchet-wheel 26, that is engaged by a pawl 27, which may be moved into and out of engagement with the ratchet, as will be readily understood.

In connection with the frame 24, I provide a cam-faced locking attachment 29, which is supported upon a pivot 30 and so arranged that by a slight turn the cam-face may be brought to bear upon the upper face of the cross-bar $c$ of the frame 24, and any continued turning of the locking device 29 will cause the roller 23 to bear hard down against the upper face of the bosom-board.

In using the board arranged as above described the projection 22 is passed through the neck of the shirt and the tail of the shirt is passed about the roller 23, after which the roller is turned in the direction of the arrow shown in Fig. 3 until a proper tension is imparted to the shirt. Then the locking device 29 is turned in a direction such that the roller will be brought to bear hard down upon the bosom-board and the shirt will be held as desired.

Upon one side of the cabinet I arrange series of shelves 31, 32, 33, and 34, and these shelves I propose to employ for the stowage of towels and table and bed linen, (but the shelves could be used for any purpose desired,) and upon the opposite side of the cabinet I arrange a shelf 35, that is designed especially to hold flat-irons. Above the shelf 35, I arrange hooks 36, upon which coats, wraps, &c., may be hung, and upon the under side of the ironing-board 13, I secure a hook 38, which serves as a hat-hook when the board 13 is in the position in which it is shown in Fig. 1.

In the bottom of the cabinet shoes, &c., may be placed, while upon the inner face of the door I mount a roller 39, upon which there is suspended a towel 40. If desired, slipper or shoe pockets 41 may be secured to the inner face of the lower panel of the door.

By arranging the cabinet as above described I provide for the stowage of a great number of necessary articles, and I am enabled to properly house the ironing-board and at the same time provide for its rigid support when in use.

Having thus described my invention, I claim as new and desire to secure by Letters Patent—

1. The combination, with a kitchen-cabinet having an open front provided with a door and guideways in the lower portions of its sides extending upwardly and outwardly to the door-opening, of an ironing-board of a length to pass through the door-opening into the cabinet, and provided at its inner end with projections entering said ways, whereby the board may be raised from its operative position, pushed inwardly, and lowered to completely inclose it within the cabinet, substantially as set forth.

2. The combination, with a cabinet formed with slots $a$ and $b$, of a brace 12, hinged to the flooring of the cabinet, and an ironing-board hinged to the brace and provided with a cross-bar which rides in the slots $a$ and $b$, substantially as described.

3. The combination, with an ironing-board, of a bosom-board hinged thereto, a frame arranged in connection with the bosom-board, a roller supported by the frame, a ratchet-wheel carried by the roller, a pawl arranged to engage the ratchet, and a frame-locking cam pivoted to the under side of the bosom-board and adapted to engage the lower cross-piece of the frame and press the roller against the upper side of said bosom-board, substantially as described.

4. The combination, with the bosom-board, of the movable frame 24, embracing it, the roller 23, journaled in the side bars of the frame and extending across the upper side of the board, links pivoted to the board and to the frame, a cam for operating the frame to bring the roller against the board, and means for adjusting the roller, substantially as set forth.

5. A kitchen-cabinet having an open front, upwardly and outwardly extending slots or ways $a\ b$ in its sides, the lower ends of the slots being about midway between the vertical edges of the sides, the ironing-board having a cross-piece 14 entering said slots or ways, a bosom-board hinged at its rear end to the rear end of the ironing-board on the upper side thereof, a brace 12, hinged at its upper end to the lower side of the ironing-board between the ends thereof and at its lower end hinged to the cabinet-bottom in front of the lower ends of the slots or ways, the bench 16, hinged to the outer side of the brace between its ends, whereby the bosom-board will occupy the space behind the ironing-board and the bench the space in front thereof when the said parts are swung into the cabinet, substantially as set forth.

6. The combination, with a cabinet, of a brace hinged therein, a wash-bench hinged to the brace, a catch arranged in connection with the wash-bench, an ironing-board hinged to the brace, and a transverse strip carried by the ironing-board and arranged to ride in grooves or recesses formed in the cabinet, substantially as described.

JOHN NELSON BALL.

Witnesses:
 LIZZIE DONAHUE,
 T. W. NEWMAN.